US005481989A

United States Patent [19]

Beeghly et al.

[11] Patent Number: 5,481,989
[45] Date of Patent: Jan. 9, 1996

[54] METHOD OF COLLECTING AND CONDITIONING A PETROLEUM COKE FLUID BED COMBUSTION ASH

[75] Inventors: Joel H. Beeghly, Bessemer, Pa.; John C. Davis, Lake Charles, La.

[73] Assignee: J. H. Beeghly to Dravo Lime Company, Pittsburgh, Pa.

[21] Appl. No.: 294,554

[22] Filed: Aug. 23, 1994

[51] Int. Cl.⁶ .......................................................... F23J 3/00
[52] U.S. Cl. ....................... 110/344; 110/259; 110/165 A
[58] Field of Search ................................. 110/165 A, 171, 110/259, 344; 588/256

Primary Examiner—Denise L. Gromada
Assistant Examiner—Susanne C. Tinker
Attorney, Agent, or Firm—Armstrong, Westerman, Hattori, McLeland & Naughton

[57] ABSTRACT

A method of collecting and conditioning either or both of a fluid bed combustion cyclone or bed ash, from a sulfur-containing petroleum coke combustion, by transferring dry combustion ash, containing anhydrous calcium sulfate and resultant lime to a pneumatic tanker, transferring the tanker with the ash to a storage site, and discharging the dry ash through a mixing pump onto the storage site while adding sufficient water to hydrate anhydrous calcium sulfate and resultant lime in the ash and provide about 7–25 percent by weight excess water in the ash.

14 Claims, No Drawings

METHOD OF COLLECTING AND CONDITIONING A PETROLEUM COKE FLUID BED COMBUSTION ASH

FIELD OF THE INVENTION

The present invention relates to a method of collecting and conditioning a fluid bed combustion ash, formed by the fluidized bed combustion of petroleum coke, in an environmentally friendly manner with formation of a salable by-product.

BACKGROUND OF THE INVENTION

Petroleum coke is a fuel that has high heating value and low volatility but has a disadvantage in that it contains a high sulfur content. Such high sulfur content fuels must be combusted in the presence of sulfur dioxide acceptors for sulfur dioxide resulting from the combustion or the resultant combustion gases must be contacted with a sulfur dioxide acceptor so that objectionable amounts of sulfur dioxide are not released to the atmosphere following combustion. An especially useful combustion process for petroleum coke involves the use of a fluidized bed boiler where limestone is injected as a sorbent for sulfur dioxide. At the combustion temperatures, the limestone ($CaCO_3$) is calcined to form lime and carbon dioxide ($CaO+CO_2$) with the lime reacting with sulfur dioxide in the combustion gas to form anhydrous calcium sulfate ($CaSO_4$). The resultant combustion ashes are in two forms, a bed ash, or solids resulting from the combustion that are collected in the boiler, and a cyclone ash, or gas-borne solids that are removed from the combustion ashes in a cyclone or other separator prior to discharge of the combustion gas to the atmosphere.

The combustion bed ash and cyclone ash from a petroleum coke-fired fluidized bed combustion (PCFBC) are composed of primarily calcium oxide and anhydrous calcium sulfate with small amounts of magnesium oxide, silicon dioxide, iron oxide and aluminum oxide and have a much higher free lime, or quicklime, (CaO) content than a coal fired FBC. If water is added to the hot, dry, combustion bed ash and cyclone ash to place it in condition for transfer to a disposal site, an enormous amount of heat and vapor are created which, in an enclosed area, causes an unsafe situation. Ash that cannot be used in a dry state, shipped directly from storage, must be trucked to a land storage site in a moist condition in order to control fugitive dust from wind or truck traffic. The petroleum coke-fired fluidized bed combustion ash has a large demand for water in order to be able to maintain a residual moisture content in a land storage site. Also, to water-condition the ash so that it can be used as a road construction material, a large amount of water must be added in a controlled manner. The use of ash conditioners, located at the confined and high traffic area of a power plant, to hydrate the high quicklime containing material, is impractical and unsafe due to the dangerously high heat of hydration and steam vapors, which result in visibility problems. Excessive water addition also creates a dangerous situation where water spillage from open transfer dump trucks allows wet ash to collect on roads.

SUMMARY OF THE INVENTION

A fluid bed combustion ash, formed by the combustion of a sulfur-containing petroleum coke in the presence of excess limestone over that required to remove sulfur dioxide from the resulting combustion gases, which ash contains anhydrous calcium sulfate and resultant lime, is collected and conditioned for subsequent use. The dry combustion ash, containing anhydrous calcium sulfate and resultant lime, is transferred to a pneumatic tanker at the source of production and the tanker transferred to a remote location having a storage site. The dry ash is then discharged from the tanker while being mixed in a mixing pump with sufficient water to hydrate the anhydrous calcium sulfate and resultant lime in the ash and to provide about 7 to 25 percent by weight of excess moisture in the ash, while the hydrated ash is being deposited at the storage site.

The dry fluid bed combustion ash that is collected and conditioned may be either a bed ash, a cyclone ash, or a mixture of bed and cyclone ash.

DETAILED DESCRIPTION

A fluid bed combustion ash, formed by the fluid bed combustion of a sulfur-containing petroleum coke, where limestone is added to the combustion boiler to remove sulfur dioxide resulting from the combustion, is collected and conditioned according to the present method.

The fluid bed combustion ash results from fluid bed combustion of a petroleum coke. Such petroleum cokes, as used in the present invention, generally contain, by weight, about 75–86 percent carbon, 3.0–3.6 percent hydrogen, 1.3–1.9 percent nitrogen, 3.4–5.3 percent sulfur, up to 0.6 percent ash, up to 0.1 percent oxygen, and about 5.5–15.0 percent moisture. An especially useful petroleum coke fuel is a delayed petroleum coke containing, by weight, about 79.74 percent carbon, about 3.31 percent hydrogen, about 1.61 percent nitrogen, about 4.47 percent sulfur, about 0.27 percent ash, 0 percent oxygen, and about 10.60 percent moisture. The sulfur content of the petroleum coke is converted, according to conventional procedures, to anhydrous calcium sulfate by injection into the combustion chamber of limestone in an amount in excess of that required for stoichiometric reaction with the sulfur present in the petroleum coke, the limestone calcining to form lime which reacts with the sulfur. The excess limestone, on calcination, provides a resultant lime which, along with the anhydrous calcium sulfate, are the primary components of the combustion ash resulting from the combustion.

Generally, the bed ash which is formed in and collected from the boiler of the fluid bed combustion has a composition (chemical analysis-oxide form) of between about, by weight, 44.3 to 51.3% CaO; 1.1 to 2.0% MgO; 0.4 to 3.0% $SiO_2$; 0.1 to 0.2% $Fe_2O_3$; 0.1 to 0.3% $Al_2O_3$; 42 to 46% sulfate (as $SO_3$); 0.4 to 1.02 sulfite (as $SO_2$) and loss on ignition (at 1100° C.) of 0.5 to 2.0%, with an available lime content as CaO of between 10 to 20% and a specific gravity of between 2.8 to 3.2; while the cyclone ash that is removed from the combustion gases resulting from the combustion has a composition (chemical analysis-oxide form) of between about, by weight, 55.3 to 60.0% CaO; 1.5 to 2.3% MgO, 0.6 to 1.2% $SiO_2$; 0.1 to 0.3% $Fe_2O_3$; 0.1 to 0.4% $Al_2O_3$; 31.1 to 36.4% sulfate (as $SO_3$); 0.2 to 1.0% sulfite (as $SO_2$) and loss on ignition (at 1100° C.) of 3.0 to 5.8%, with an available lime content as CaO of between 21 to 34% and a specific gravity of between 2.9 to 3.0. The bed ash and cyclone ash may vary in ratio to each other but usually the combustion produces ash in an amount of about 60–80 percent by weight cyclone ash and 20–40 percent by weight bed ash, and most generally in an amount of about 70 percent by weight cyclone ash and 30 percent by weight bed ash.

The dry petroleum coke fluid bed combustion ash, with a significant amount of resultant lime, as quicklime, will upon contact with water release a significant amount of heat and is therefor transferred in a dry condition, at a source of production thereof, to a pneumatic tanker or truck. By such transfer, the hot, dry ash can be safely transported to a remote storage site. The tanker containing the dry ash, which includes the anhydrous calcium sulfate and resultant lime, is transferred to a remote location having a storage site, such as an earthen dam, ground cavity or pit.

After transferring of the pneumatic tanker to a storage site, the dry ash, containing the anhydrous calcium sulfate and resultant lime, is discharged from the pneumatic tanker onto the storage site through a mixing pump, such as a Halliburton jet mixer pump, while mixing the dry combustion ash with water. The amount of water mixed with the dry combustion ash is an amount sufficient to hydrate the anhydrous calcium sulfate and resultant lime in the ash and additionally provide between about 7 to 25 percent by weight of excess moisture in the ash. In general terms, it has been found sufficient to add a minimum of about 80–120 gallons, preferably 100 gallons (830 pounds) of water per ton (2,000 pounds) of dry ash in a controlled mixing operation in the mixer. The amount of water for hydration is dependent on the amount of quicklime (CaO) present in the ash and the amount of anhydrous calcium sulfate ($CaSO_4$) present in the ash, with an excess of water added to achieve the desired moisture content. The water added is preferably in an amount of between 40 to 50 percent by weight based on the weight of the dry ash. The addition of the described amount of water in a controlled mixing operation permits the expansion or volume increase in the hydrated material to be effected in a short period of time due to the hydration of the anhydrous calcium sulfate and the resultant lime.

By using the present method, hydration of the petroleum coke-fired fluid bed combustion ash is more visible and thus controllable and safer than hydration in an enclosed building or area at the site of the combustion. Addition of a controlled amount of water insures less than an optimum moisture content in the hydrated ash and produces a base material or product that can be later used on demand. Only upon later compaction for a stabilized base or embankment would the additional water for optimum moisture content be added so as to result in an optimum strength gain in the material.

At the remote location, a plurality of hydration pit sites may be provided with one alternating site being used for acceptance of the discharged hydrated ash while previously deposited hydrated ash is being removed from another adjacent site. Thus, while one site or pit is being filled, another site or pit may be excavated and the previously deposited hydrated material placed in a stockpile or a final landfill disposal site. A pit may, of course, be dedicated to primarily bed ash or cyclone ash.

The resultant hydrated coke-fired fluid bed combustion ash can be excavated from the storage site and sold for use as a stabilized road base or embankment material, and provides a light weight structural fill material devoid of any unhydrated lime content.

What is claimed is:

1. A method of collecting and conditioning a fluid bed combustion ash formed by the combustion of a sulfur-containing petroleum coke, in the presence of excess limestone over that required to remove sulfur dioxide resulting from said sulfur as anhydrous calcium sulfate, with the production of a resultant lime from said excess limestone, comprising:

transferring dry combustion ash, containing anhydrous calcium sulfate and said resultant lime, to a pneumatic tanker at a source of production of said ash;

transferring said pneumatic tanker with said dry ash, containing said anhydrous calcium sulfate and resultant lime, to a remote location having a storage site;

discharging said dry ash, containing said anhydrous calcium sulfate and resultant lime, from said pneumatic tanker onto said storage site through a mixing pump while adding thereto an amount of water sufficient to hydrate said anhydrous calcium sulfate and said resultant lime and provide between about 7 to 25 percent by weight of excess moisture in said ash.

2. The method of collecting and conditioning a fluid bed combustion ash formed by the combustion of a sulfur-containing petroleum coke as defined in claim 1 wherein said dry combustion ash is a cyclone ash separated from the combustion gases formed by said combustion.

3. The method of collecting and conditioning a fluid bed combustion ash formed by the combustion of a sulfur-containing petroleum coke as defined in claim 1 wherein said dry combustion ash is a bed ash collected in a boiler for said fluid bed combustion.

4. The method of collecting and conditioning a fluid bed combustion ash formed by the combustion of a sulfur-containing petroleum coke as defined in claim 1 wherein said dry combustion ash is a mixture of a cyclone ash separated from the combustion gases formed by said combustion and a bed ash collected in a boiler from said fluid bed combustion.

5. The method of collecting and conditioning a fluid bed combustion ash formed by the combustion of a sulfur-containing petroleum coke as defined in claim 4 wherein said mixture contains between about 60–80 percent by weight of said cyclone ash and 40–20 percent by weight of said bed ash.

6. The method of collecting and conditioning a fluid bed combustion ash formed by the combustion of a sulfur-containing petroleum coke as defined in claim 5 wherein said mixture contains about 70 percent by weight of said cyclone ash and about 30 percent by weight of said bed ash.

7. The method of collecting and conditioning a fluid bed combustion ash formed by the combustion of a sulfur-containing petroleum coke as defined in claim 1 wherein said water is added in an amount of between 40–50 percent by weight based on the weight of said dry ash.

8. The method of collecting and conditioning a fluid bed combustion ash formed by the combustion of a sulfur-containing petroleum coke as defined in claim 1 wherein said water is added in an amount of about 80–120 gallons of water per ton of said dry ash.

9. The method of collecting and conditioning a fluid bed combustion ash formed by the combustion of a sulfur-containing petroleum coke as defined in claim 1 wherein said sulfur-containing petroleum coke contains about 3.4–5.3 percent by weight sulfur.

10. The method of collecting and conditioning a fluid bed combustion ash formed by the combustion of a sulfur-containing petroleum coke as defined in claim 9 wherein said sulfur-containing petroleum coke also contains about 75–86 percent carbon, about 3.0–3.6 percent hydrogen, about 1.3–1.9 percent nitrogen, up to 0.6 percent ash, up to 0.1 percent oxygen, and about 5.5–15.0 percent moisture.

11. A method of collecting and conditioning a fluid bed combustion cyclone ash formed by the combustion of a sulfur-containing petroleum coke, in the presence of excess limestone over that required to remove sulfur dioxide resulting from said sulfur as anhydrous calcium sulfate, with the production of a resultant lime from said excess limestone, said cyclone ash being separated from the combustion gases formed by said combustion, comprising:

transferring dry cyclone combustion ash, containing anhydrous calcium sulfate and said resultant lime, to a pneumatic tanker at a source of production of said cyclone ash;

transferring said pneumatic tanker with said dry cyclone ash, containing said anhydrous calcium sulfate and resultant lime, to a remote location having a storage site;

discharging said dry cyclone ash, containing said anhydrous calcium sulfate and resultant lime, from said pneumatic tanker onto said storage site through a mixing pump while adding thereto water in an amount of between 40–50 percent by weight based on the weight of said dry cyclone ash.

12. The method of collecting and conditioning a fluid bed combustion cyclone ash as defined in claim 11 wherein said cyclone ash has a composition of between about, by weight; 55.3 to 60.0% CaO; 1.5 to 2.3% MgO; 0.6 to 1.2% $SiO_2$; 0.1–0.3% $Fe_2O_3$; 0.1 to 0.4% $Al_2O_3$; 31.1 to 36.4% sulfate (as $SO_3$); 0.2 to 1.0% sulfite (as $SO_2$) and loss on ignition (at 1100° C.) of 3.0 to 5.8%, with an available lime content as CaO of between 21 to 34%, and a specific gravity of between 2.9 to 3.0.

13. A method of collecting and conditioning a fluid bed combustion bed ash formed by the combustion of a sulfur-containing petroleum coke, in the presence of excess limestone over that required to remove sulfur dioxide resulting from said sulfur as anhydrous calcium sulfate, with the production of a resultant lime from said excess limestone, said bed ash collected in a boiler for said fluid bed combustion, comprising:

transferring dry bed combustion ash, containing anhydrous calcium sulfate and said resultant lime, to a pneumatic tanker at a source of production of said bed ash;

transferring said pneumatic tanker with said dry bed ash, containing said anhydrous calcium sulfate and resultant lime, to a remote location having a storage site;

discharging said dry bed ash, containing said anhydrous calcium sulfate and resultant lime, from said pneumatic tanker onto said storage site through a mixing pump while adding thereto water in an amount of between 40–50 percent by weight based on the weight of said dry bed ash.

14. The method of collecting and conditioning a fluid bed combustion bed ash as defined in claim 13 wherein said bed ash has a composition of between about, by weight, 44.3 to 51.3% CaO; 1.1 to 2.0% MgO; 0.4 to 3.0% $SiO_2$; 0.1 to 0.2% $Fe_2O_3$; 0.1 to 0.3% $Al_2O_3$; 42 to 46% sulfate (as $SO_3$); 0.4 to 1.02% sulfite (as $SO_2$) and loss on ignition (at 1100° C.) of 0.5 to 2.0%, with an available lime content as CaO of between 10 to 20%, and a specific gravity of between 2.8 to 3.2.

* * * * *